UNITED STATES PATENT OFFICE.

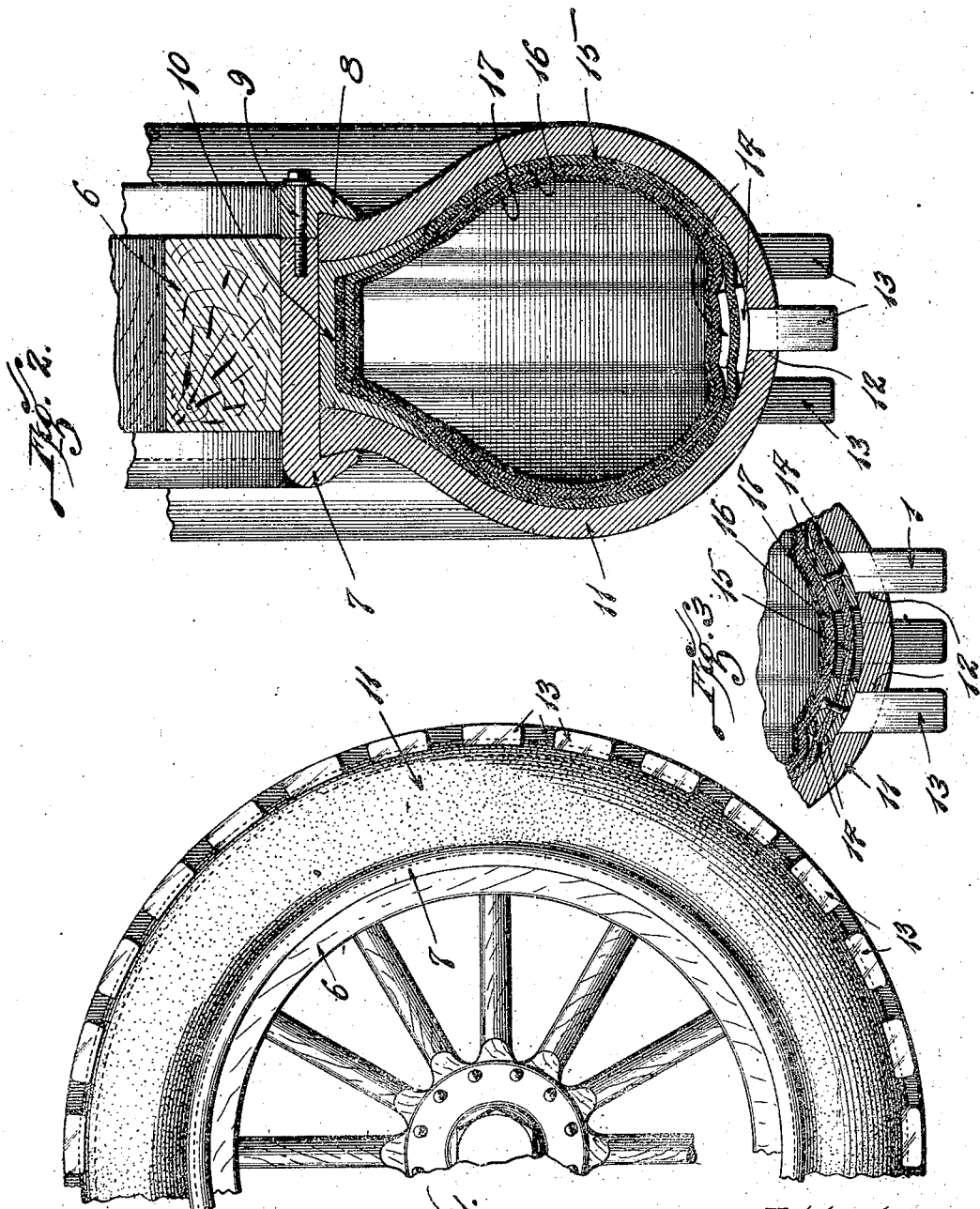

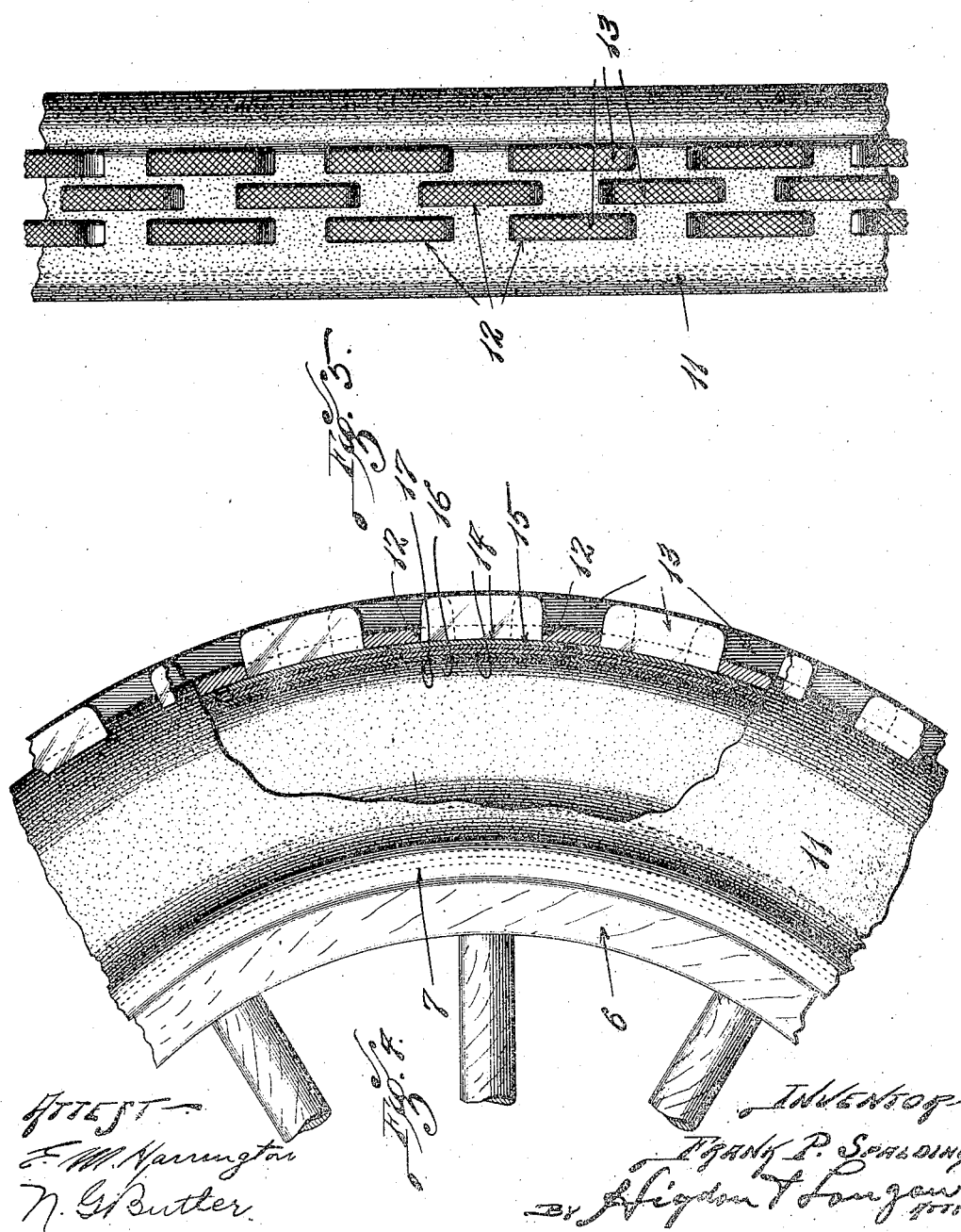

FRANK P. SPALDING, OF ST. LOUIS, MISSOURI.

PUNCTURE-PROOF TIRE.

1,132,693.

Specification of Letters Patent. Patented Mar. 23, 1915.

Application filed August 11, 1913. Serial No. 784,114.

*To all whom it may concern:*

Be it known that I, FRANK P. SPALDING, a citizen of the United States, and resident of St. Louis, Missouri, have invented certain new and useful Improvements in Puncture-Proof Tires, of which the following is a specification containing a full, clear, and exact description, reference being had to the accompanying drawings, forming a part hereof.

My invention relates to improvements in puncture proof tires, and the object of my invention is to construct a tire comprising a casing of nonresilient and puncture proof material, preferably metal, and to arrange therein a multiplicity of road-bearing surfaces which project through said casing and to arrange within said casing and acting on said road-bearing surfaces a cushioning means for all of said road-bearing surfaces.

With the above purposes in view my invention consists in certain novel features of construction and arrangement of parts as will be hereinafter described, pointed out in the claim and illustrated by the accompanying drawings, in which—

Figure 1 is a fragmental elevation of an ordinary automobile wheel equipped with a tire of my improved construction; Fig. 2 is an enlarged transverse sectional elevation through a portion of the wheel rim and a tire of my improved construction; Fig. 3 is a fragmental transverse sectional elevation illustrating the road-bearing surfaces and the inner tube protecting devices; Fig. 4 is a fragmental elevation on an enlarged scale showing an automobile wheel equipped with my improved tire, a portion of the tire casing being removed; and Fig. 5 is a plan of a portion of the outer casing showing the arrangement of the road-bearing surfaces.

Referring by numerals to the accompanying drawings: 6 designates the felly which may be of any ordinary construction and 7 designates a rim preferably of the clencher type, the flange 8 of which is detachably secured to the body of the rim by means of a series of set screws such as 9, and 10 designates an ordinary metallic filler-ring.

11 designates my improved outer casing which is preferably shaped identically like the ordinary open-bellied tire of the clencher type. This casing is preferably constructed of metal, although it may be of any other puncture proof and nonresilient material. In the tread portion of the casing there is formed a plurality of openings 12 through which are projected the metallic road-bearing surfaces 13. Each of these road-bearing surfaces 13 carries a pair of spaced apart plates 14 which serve as a means to limit the movement of the road-bearing surface outwardly and also as means to secure in place the inner tube protecting jackets 15 and 16.

Arranged within the innermost jacket 16 there is an ordinary inflatable inner tube 17 which bears upon the road-bearing surfaces 13 and forms therefor a cushion so that when pressure is applied to said road-bearing surfaces they will be moved relative to the nonresilient casing.

By the provision of a nonresilient and puncture proof casing associated with yielding puncture proof road-bearing surfaces acted upon by a pneumatic cushion device, such as an inflatable inner tube, I am enabled to construct a tire which possesses a maximum of wearing quality and one that is not subject to puncture and one in which I may obtain a maximum of cushion efficiency.

I claim:

In combination with a metallic tire casing having openings in its tread surface, a plurality of rigid tread devices extending through the openings in the metallic casing, spaced apart plates carried by said devices, a jacket within the casing, and held between said plates and an inflatable tube acting on said devices, substantiaclly as shown and for the purposes stated.

In testimony whereof, I have signed my name to this specification, in presence of two subscribing witnesses.

FRANK P. SPALDING.

Witnesses:
 E. L. WALLACE,
 N. G. BUTLER.